Sept. 27, 1949.    G. W. SMITH    2,483,110
RECTIFIER TREATMENT
Filed Nov. 2, 1945
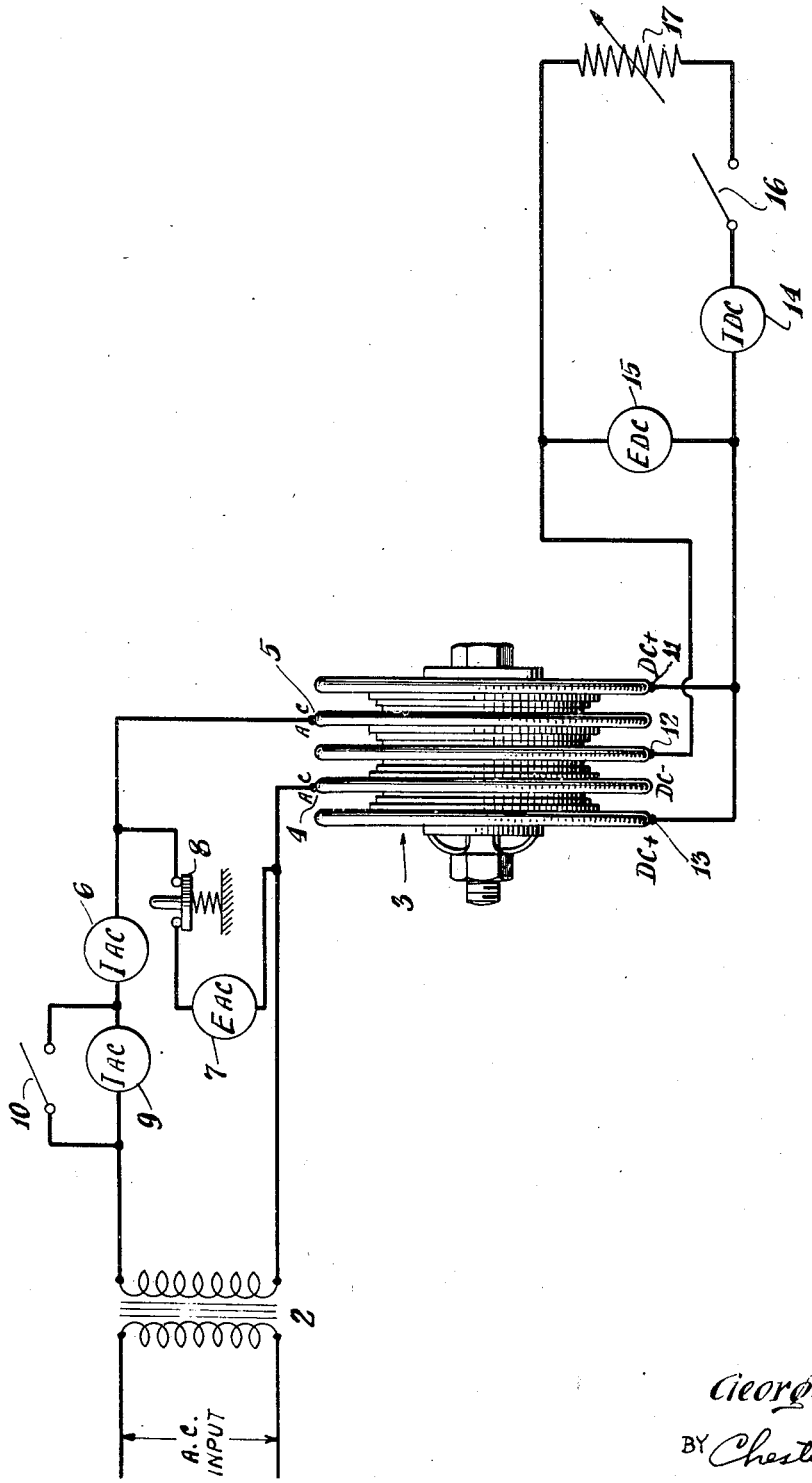
INVENTOR
George W. Smith
BY Chester F. Carlson
ATTORNEY Patented Sept. 27, 1949

2,483,110

UNITED STATES PATENT OFFICE 2,483,110

RECTIFIER TREATMENT

George W. Smith, Indianapolis, Ind., assignor to P. R. Mallory & Co., Inc., Indianapolis, Ind., a corporation of Delaware Application November 2, 1945, Serial No. 626,402

3 Claims. (Cl. 175—366)

1

This invention relates to dry disc rectifiers and has particular reference to testing and reclaiming the same.

An object of the invention is to improve the methods of reclaiming dry disc rectifiers.

Other objects of the invention will be apparent from the following description and accompanying drawing.

The figure in the drawing is a circuit diagram of the testing and reclaiming circuit.

In the manufacture of magnesium-copper sulfide rectifiers, of the type described in U. S. Patent 1,751,359 to Samuel Ruben, for example, it was found that, while the junction of the magnesium and cupric sulfide electrodes was integrally bonded and electrically stable, it was subject to detrimental reactions in contact with moisture. The reaction of magnesium sulfide with water yielded magnesium oxide and hydrogen sulfide and caused progressive blocking off of the effective junction area by production of a magnesium oxide layer. This moisture effect was avoided by applying several layers of waterproof and heat resistant varnish to the surface of the completed rectifier assembly and baking the varnished assembly.

It has been found, however, that during the baking process, the seepage of the varnish or paint and the oily smoke therefrom into the interspaces of the rectifier elements, has necessitated the rejection of a certain number of the rectifiers as defective because of unduly high electrical resistance.

The present invention contemplates a method of testing rectifiers and a procedure for the reclaiming of rectifiers found to be defective from the causes set forth above.

The drawing shows a schematic diagram of the testing and reclaiming circuit. A four-way bridge rectifier 3 is connected at terminals 4 and 5 to the output terminals of an alternating current transformer 2. Input alternating current is measured by ammeter 6 in series with the input conductors, while input voltage is indicated by voltmeter 7, connected across the input conductors, by push button switch 8. A lower-reading ammeter 9 may be shunted out of the circuit by switch 10. The direct current output circuit is connected to terminals 11, 12 and 13 of rectifier 3. The direct current output is measured by

2 ammeter 14 connected in series with the output conductors while the voltage output is indicated by voltmeter 15 connected across the output conductors. The output circuit is closed by switch 16 and rheostat 17 affords a means for controlling the current output of the rectifier.

The rectifier is tested by connecting transformer 2 to an alternating current source, the transformer being arranged to apply predetermined voltage across the rectifier input terminals. The rheostat 17 is adjusted until the output current measured on ammeter 14 is at a predetermined value. If the output voltage then falls within a range known to be satisfactory the rectifier is considered acceptable. If, however, the output voltage falls below the acceptable range it indicates that the rectifier has an unusually high resistance.

According to this invention such high resistance rectifiers are reclaimed by the short application of a high current input several times the safe operating current until the rectifier unit begins to smoke. This is easily accomplished in the testing circuit by setting rheostat 17 to a low resistance value. If the acceptable current output at the rated voltage of the rectifier is 5 amperes an output current of 25 to 35 amperes is drawn from the rectifier, for example. A current of five to seven times the normal is generally desirable. At the first sign of smoking, which may occur in 20 to 45 seconds, the current is turned off. The rectifier is then tested 24 hours later under the testing conditions outlined above.

It has been found according to this invention that of all the rectifiers defective because of lacquer or paint seepage, 90 to 95% can be reclaimed for use.

While specific embodiments of the invention have been described, it is intended to cover the invention broadly within the spirit and scope of the appended claims.

What is claimed is:

1. The method of lowering the resistance of dry disc magnesium-copper sulphide rectifiers into which there is lacquer and paint seepage which comprises subjecting said rectifier to a high current treatment to remove such lacquer and paint.

2. The method of reclaiming lacquered magnesium-copper sulfide rectifiers defective because of lacquer seepage which comprises treating said rectifiers with an electric current 5 to 7 times normal for about ½ to a full minute.

3. The method of treating lacquered magnesium-copper oxide rectifiers defective because of lacquer seepage which comprises subjecting said rectifiers to an input current of about 5 to 7 times their normal safe operating current until they begin to smoke.

GEORGE WM. SMITH.

REFERENCES CITED

The following references are of record in the file of this patent:

UNITED STATES PATENTS

| Number | Name | Date |
|---|---|---|
| 1,307,341 | Brinton | June 24, 1919 |
| 1,586,889 | Elmen | June 6, 1926 |
| 1,751,361 | Ruben | Mar. 18, 1930 |
| 1,835,267 | Bradley | Dec. 8, 1931 |
| 2,068,367 | Bohannon | Jan. 19, 1937 |
| 2,237,802 | Wittke | Apr. 8, 1941 |
| 2,321,587 | Davie et al. | June 15, 1943 |
| 2,362,545 | Ellis | Nov. 14, 1944 |
| 2,390,771 | Blackburn | Dec. 11, 1945 |